United States Patent
MacBeth et al.

(10) Patent No.: US 8,255,472 B2
(45) Date of Patent: *Aug. 28, 2012

(54) TRACKING OF ELECTRONIC MAIL MESSAGES

(75) Inventors: Melissa R. MacBeth, Seattle, WA (US); Alon Asher Brown, Redmond, WA (US); Aime Michelle Mitchell, Seattle, WA (US); Richard H. Leukart, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/299,966

(22) Filed: Nov. 18, 2011

(65) Prior Publication Data

US 2012/0066329 A1  Mar. 15, 2012

Related U.S. Application Data

(63) Continuation of application No. 12/626,994, filed on Nov. 30, 2009, now Pat. No. 8,086,682, which is a continuation of application No. 11/204,865, filed on Aug. 15, 2005, now Pat. No. 7,660,859.

(51) Int. Cl.
*G06F 15/16* (2006.01)
(52) U.S. Cl. ........................................................ 709/206
(58) Field of Classification Search .................. None
See application file for complete search history.

(56) References Cited

U.S. PATENT DOCUMENTS

| | | | |
|---|---|---|---|
| 6,108,688 A * | 8/2000 | Nielsen | 709/206 |
| 7,089,287 B2 * | 8/2006 | Bellotti et al. | 709/206 |

OTHER PUBLICATIONS

Non-Final Rejection, U.S. Appl. No. 11/204,865, dated Oct. 17, 2008, 18 pages.
Amendment to Non-Final Rejection, U.S. Appl. No. 11/204,865, dated Jan. 15, 2009, 17 pages.
Final Rejection, U.S. Appl. No. 11/204,865, dated Feb. 26, 2009, 18 pages.
Amendment to Final Rejection, U.S. Appl. No. 11/204,865, dated Jun. 25, 2009, 12 pages.
Non-Final Rejection, U.S. Appl. No. 11/204,865, dated Jul. 17, 2009, 17 pages.
Amendment to Non-Final Rejection, U.S. Appl. No. 11/204,865, dated Sep. 21, 2009, 14 pages.
Notice of Allowance and Fees Due (PTOL-85), U.S. Appl. No. 11/204,865, dated Nov. 25, 2009, 7 pages.
Shawn L. Morrissey, Naming the colored flags in Outlook 2003, Feb. 6, 2004, Microsoft Developer Network, 1 page.
Notice of Allowance, U.S. Appl. No. 12/626,994, dated Aug. 19, 2011, 9 pages.

(Continued)

*Primary Examiner* — Moustafa M Meky
*Assistant Examiner* — Clayton R Williams

(57) ABSTRACT

Electronic mail messages are tracked for the sender by allowing the sender to flag the electronic mail messages. Flagging the electronic mail messages allows for various notifications to be provided to the sender. For example, notification may be provided to the sender by placing an item in a to-do bar for the sender that corresponds to the electronic mail message. As another example, notification may be provided to the sender by firing a reminder at some future time that corresponds to the electronic mail message. As another example, notification may be provided to the sender by including an indication in a related incoming electronic mail message that the incoming electronic mail message is related to the electronic message sent by the sender.

20 Claims, 11 Drawing Sheets

OTHER PUBLICATIONS

Amendment to Final Rejection, U.S. Appl. No. 12/626,994, dated Jul. 26, 2011, 16 pages.
Final Rejection, U.S. Appl. No. 12/626,994, dated Mar. 2, 2011, 18 pages.
Amendment to Non-Final Rejection, U.S. Appl. No. 12/626,994, dated Dec. 16, 2010, 17 pages.
Non-Final Rejection, U.S. Appl. No. 12/626,994, dated Sep. 16, 2010, 16 pages.

* cited by examiner

TRACKING OF ELECTRONIC MAIL MESSAGES

CROSS-REFERENCE TO RELATED APPLICATIONS

This application claims priority to and is a continuation of U.S. patent application Ser. No. 12/626,994 entitled "Tracking of Electronic Mail Messages" and filed Nov. 30, 2009 which is a continuation of U.S. patent application Ser. No. 11/204,865 entitled "Tracking of Electronic Mail Messages" and filed Aug. 15, 2005. The entireties of the aforementioned applications are incorporated herein by reference.

BACKGROUND

Electronic mail messages are a convenient way of communicating. Often, an electronic mail message is sent for a situation where some activity should take place thereafter. For example, the sender may expect that the recipient will take some action as a result of receiving the electronic mail message, such as sending a reply electronic mail message or performing some other task. As another example, the sender may be expected to take some action as a result of having sent the electronic mail message, such as sending an electronic mail message that specifically states that the sender will do something on behalf of the recipient.

Conventionally, there is no manner of selecting that the electronic mail message, while being prepared by the sender, be tracked in order to provide notifications to the sender that remind the sender to follow-up on the electronic mail message. For users of the OUTLOOK® 2003 electronic mail message program by Microsoft Corporation of Redmond, Wash., senders can set follow-up flags for recipients but not for themselves when composing an electronic mail message. To set a follow-up flag for themselves, the senders have resorted to taking additional avenues, such as manually setting up a specific task entry, copying oneself on the sent electronic mail message and then flagging the received electronic mail message in the Inbox folder, or moving a stored copy of the sent electronic mail message which currently surfaces within the Sent Items folder so as to have it surface within the Inbox folder and then flagging the moved electronic mail message in the Inbox. Thus, the user must take steps beyond composing and sending the electronic mail message in order to manually create a way to be notified about following up.

SUMMARY

Tracking of sent electronic mail messages occurs by providing the sender with an option to flag the electronic mail message to provide a notification regarding the sent electronic mail message to the sender. The resulting notification may take on one or more of various forms such as but not limited to a to-do bar item corresponding to the electronic mail message, a reminder associated with the electronic mail message that fires at some future time, and an indication within an incoming electronic mail message noting that it is related to the electronic mail message that has been flagged by the sender. Furthermore, the sender may be provided with an option to flag the electronic mail message to provide a possibly different notification regarding the sent electronic mail message to the recipient in addition to providing the notification regarding the sent electronic mail message to the sender.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

One or more notifications relating to an electronic mail message that has been composed are provided to the sender of the electronic mail message when the sender selects an option for the electronic mail message to be flagged. According to one or more embodiments, the sender may select the option when composing the electronic mail message or after the electronic mail message has already been sent. The notification to the sender that results from selecting the option may be of various forms discussed in more detail below.

Figure 1:
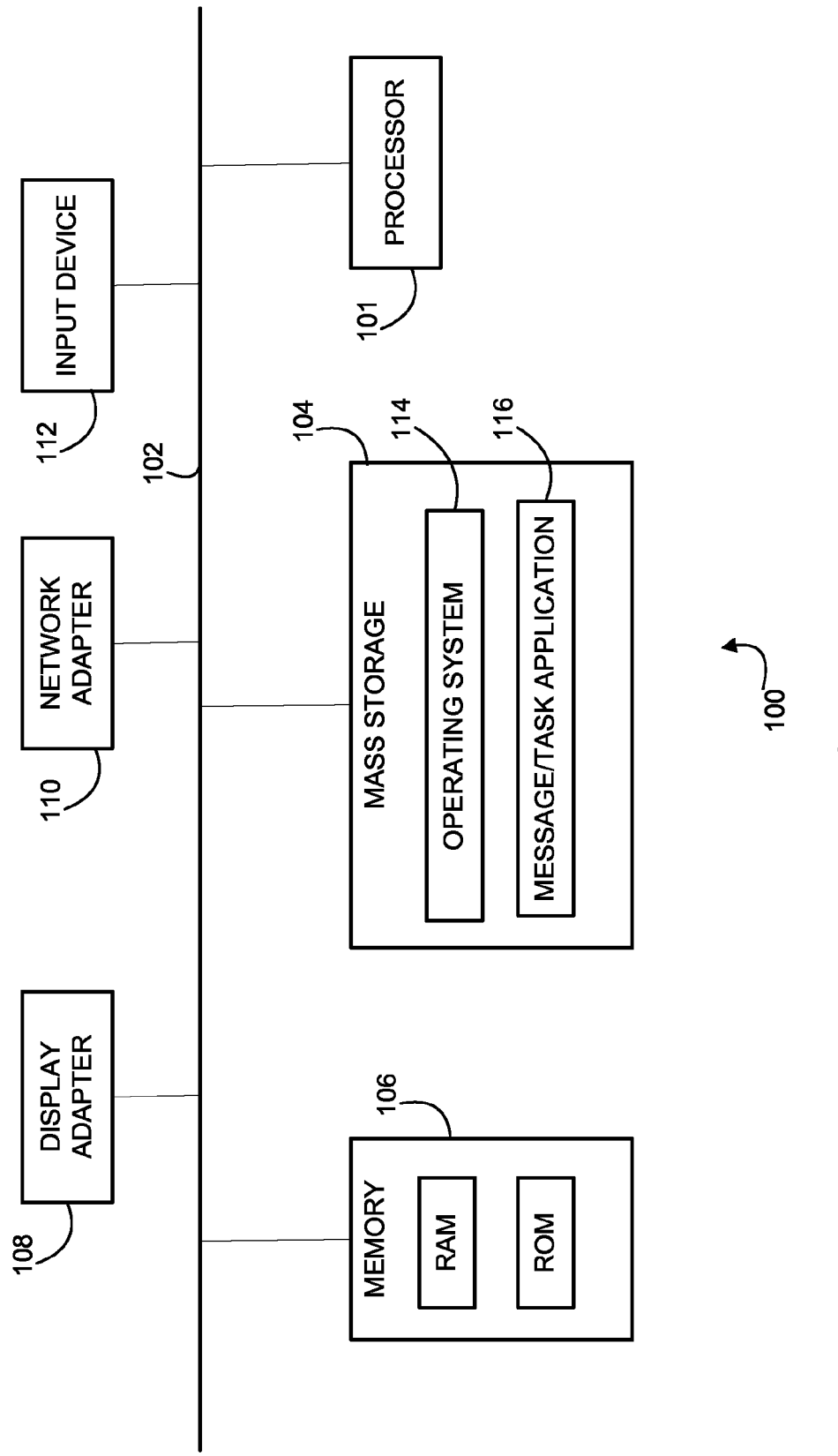
FIG. 1 shows an example of a computer system serving as an environment for embodiments that provide the sender with the option to flag the electronic mail message to provide a notification back to the sender.

FIG. 1 shows an example of a computer system 100 that provides an operating environment for the embodiments. The computer system 100 as shown may be a standard, general-purpose programmable computer system 100 including a processor 101 as well as various components including mass storage 104, memory 106, a display adapter 108, a network adapter 110, and one or more input devices 112. The processor communicates with each of the components through a data signaling bus 102. The computer system 100 may alternatively be a hard-wired, application specific device that implements one or more of the embodiments.

In the example, of FIG. 1, the processor 101 implements instructions stored in the mass storage 104 in the form of an operating system 114 and a message/task application 116, for example, a Messaging Application Programming Interface (MAPI)-compliant application. In doing so, the processor 101 provides data to a display adapter 108 that generated a display on a display screen. The display may include a graphical user interface that allows the user of the computer system 100 to interact with windows and dialog boxes of the graphical user interface when managing electronic mail messages, tasks, and other features provided by the message/task application program 116. The windows and dialog boxes include controls and data fields that allow the user to make selections and enter data when composing electronic mail messages, and the user makes such selections and enters data through an input device 112, such as a keyboard and/or mouse. Furthermore, the message/task application 116 makes use of the network adapter 110 to exchange data with remote computer systems, such as electronic mail message servers that allow the message/task application 116 to send and receive electronic mail messages.

When using the message/task application 116, the user sends electronic mail messages to others and a copy of the sent electronic mail message may be stored within a message store. The message store may be the mass storage 104 or other storage location such as a remote server, and the message store may be a specific data folder on the mass storage 104 accessible by the message/task application 116. The user of the message/task application 116 who composes electronic mail messages and chooses to track the electronic mail messages by flagging them is referred to herein as the sender, while those to whom the electronic mail message is directed are referred to herein as the recipient. FIGS. 2-8 show various examples of screenshots that are produced by the message/task application 116 when the sender is interacting with the message/task application 116. FIGS. 9A-9B show an example of an operational flow that may be performed by the message/task application 116 when interacting with the sender and specifically when responding to input from the sender to track an electronic mail message composed by the sender by providing notification back to the sender. It should be appreciated that the screenshots and operational flow are provided only for the purposes of illustration and are not intended to be limiting of the scope of the claims set forth below.

Computer system 100 typically includes a variety of computer readable media. Computer readable media can be any available media that can be accessed by computer 100 and includes both volatile and nonvolatile media, removable and non-removable media. By way of example, and not limitation, computer readable media may comprise computer storage media and communication media.

Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer system 100.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

Figure 2:
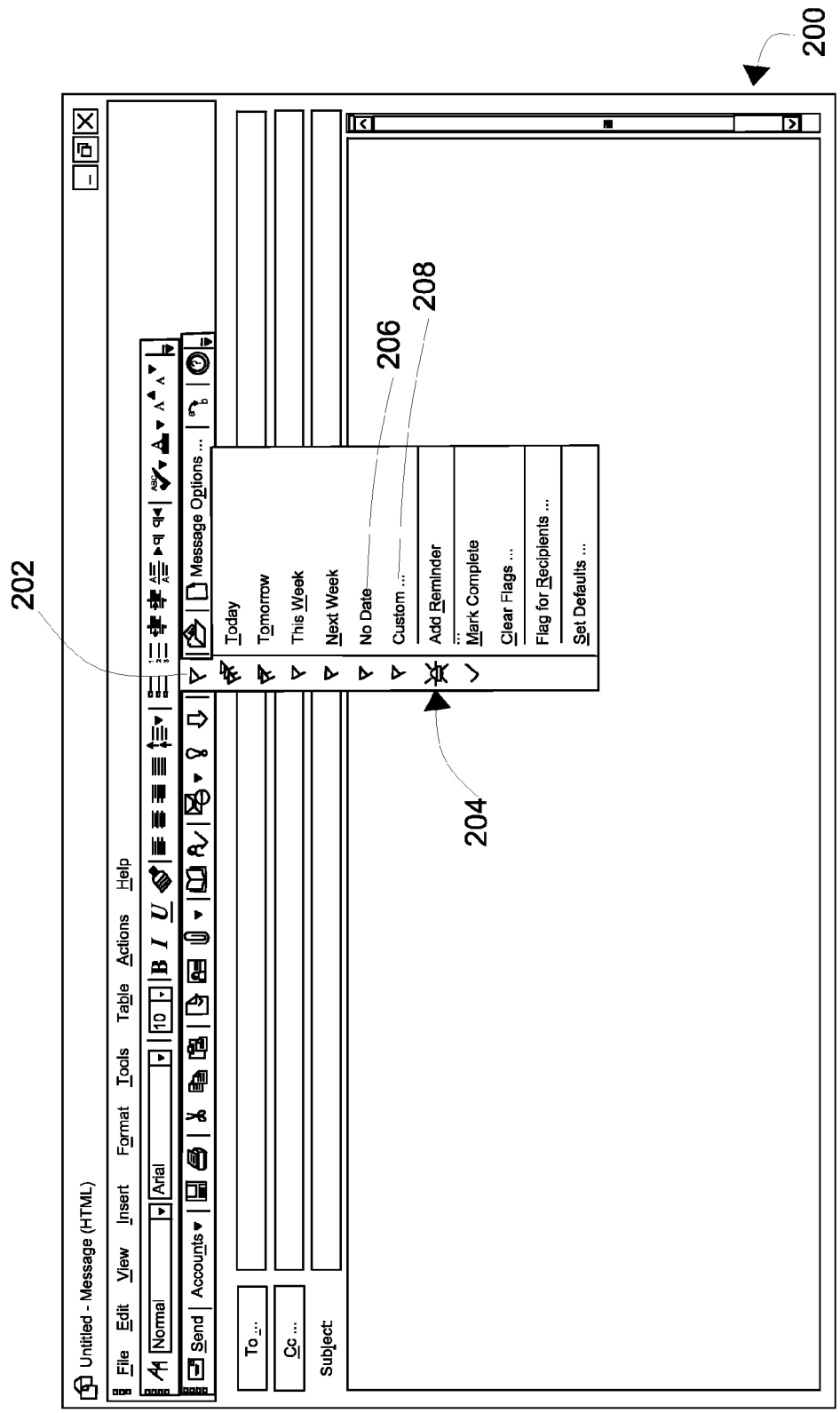
FIG. 2 is a screenshot showing an example of an electronic mail message window that provides a drop down menu allowing the sender to flag the electronic mail message to provide a notification back to the sender and/or the recipient.

FIG. 2 shows an example of a window 200 that is provided when then user selects within the message/task application 116 to create a new electronic mail message at input operation 902 of FIG. 9A. The window 200 for the new electronic mail message includes a flagging control 202 that the user may select to flag the electronic mail message so that notifications can be provided back to the sender regarding the electronic mail message. Upon the sender selecting the flagging control 202, a drop down menu 204 is displayed that provides various sub-options 206 at menu operation 904. The sub-options of this example include selections for providing a follow-up date for the sender that are to be posted within a to-do bar discussed below, such as setting the day for the follow-up as "Today," "Tomorrow," and so on. These sub-options may provide default flag data specifying a default start and end date, and a default flag name. However, the sender may also select a "Custom" sub-option 208 to set custom values.

Figure 3:
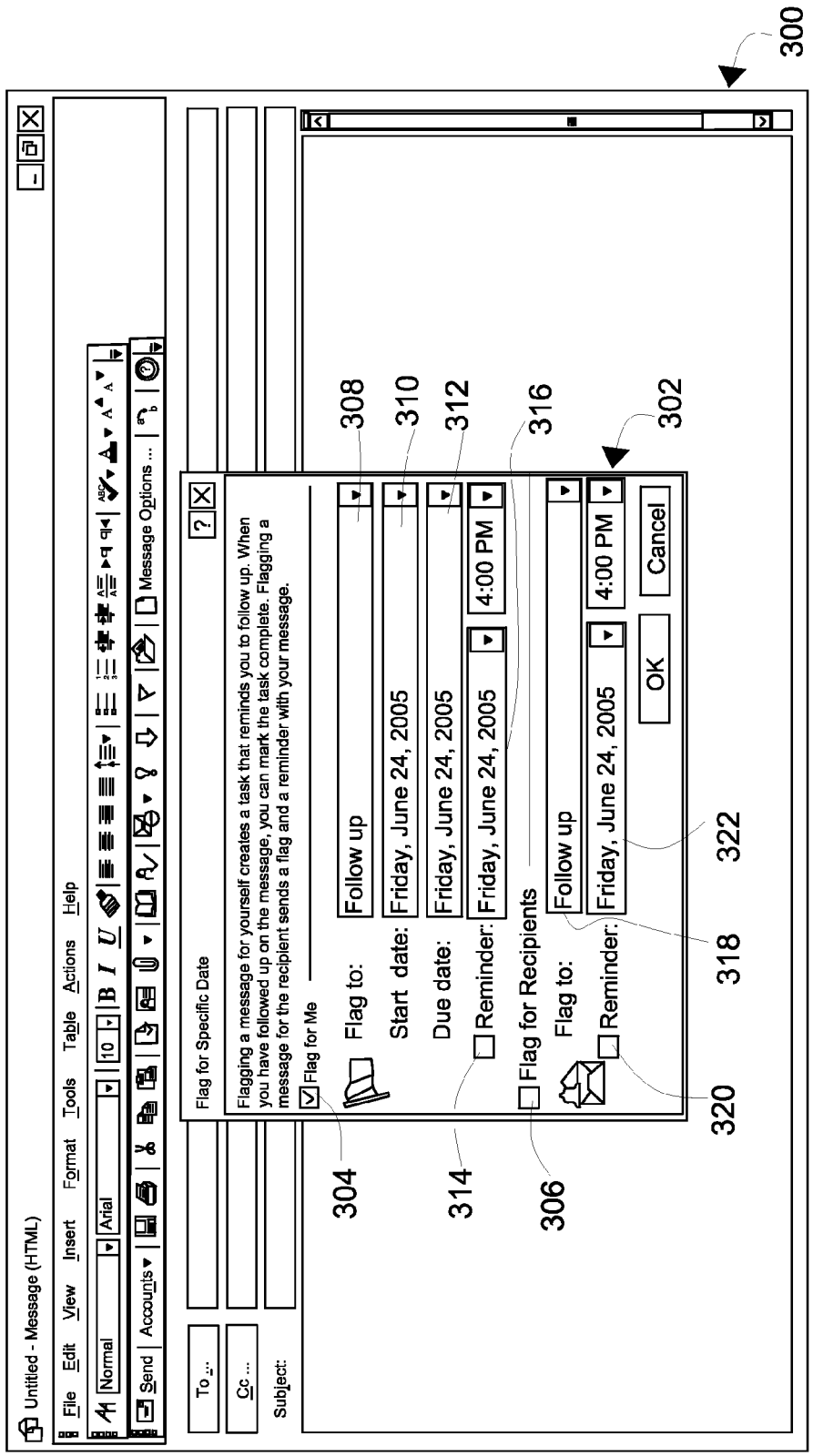
FIG. 3 is a screenshot showing an example of a dialog box that is displayed in response to the user selecting an option from the drop down menu of FIG. 2.

Now referring to FIG. 3 and screenshot window 300, once the sender has selected the "Custom" sub-option 208, the message/task application 116 receives the selection and displays a dialog box 302 that shows fields for entering flagging details at dialog operation 906. For example, a box 304 allows the sender to set the flag for providing notification only to the sender. Field 308 receives a flag name, such as a default flag to follow-up or a flag to forward the message or the user may enter a custom flag name. Field 310 receives a start date to include in the notification, and field 312 receives a due date to include in the notification.

Additionally, the sender can select box 314 within the dialog box 302 to set a reminder that fires within the message/task application 116 of the sender to provide another form of notification to the sender in relation to the electronic mail message. Fields 316 receive a date and time for the reminder to fire for the sender in the future.

Additionally, in this embodiment, the dialog box 906 allows the sender to select the option of providing flagging for the recipient to provide notification to the recipient. For example, a box 306 allows the sender to set the flag for providing notification to the recipient. Field 318 receives a name of the flag, such as a flag to follow-up, a flag to forward the message, or a custom flag name entered by the sender.

Additionally, the sender can select box 320 within the dialog box 302 to set a reminder that may fire within the message/task application of the recipient, if that message/task application supports flagging and reminders, to provide a form of notification to the recipient in relation to the electronic mail message. Fields 322 receive a date and time for the reminder to fire for the recipient in the future.

Figure 4:
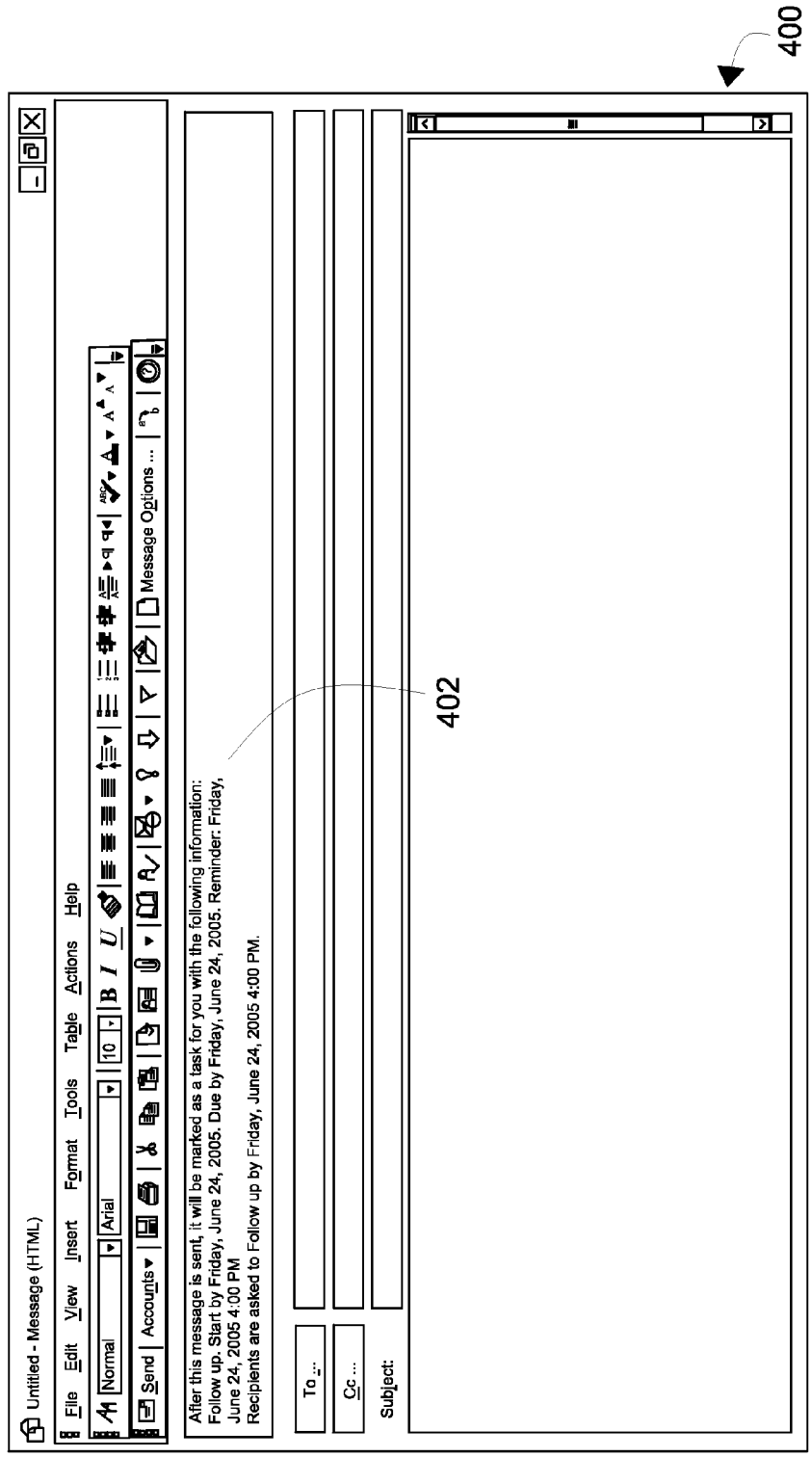
FIG. 4 is a screenshot showing an example of the electronic mail message window of FIG. 2 after the flag has been set by the sender that causes the notification to be provided back to the sender.

Now referring to FIG. 4 and screenshot window 400, once the sender has entered all of the flagging details for the sender and/or recipient notification, the message/task application 116 of the sender generates flag data from the information entered by the sender at flag operation 908. Additionally, at this point the message/task application 116 provides a notification within an information bar 402 based on the flag data. As shown in FIG. 4, the notification of information bar 402 states that once the message is sent, it will be marked as a task for the sender that has the follow-up details that have been entered by the sender. The information bar 402 may also state, if appropriate, that recipients are asked to follow-up according to the details that have been entered by the sender. The flag data is discussed in more detail below with reference to FIG. 10.

Returning briefly to FIG. 2, where the user selects an option from the drop down menu 204 that has default flag values associated with it, such as the "today" sub-option, then operational flow may proceed from menu operation 904 directly to a flag operation 908, since the operation 906 associated with the dialog box 302 of FIG. 3 is unnecessary.

At this point, the sender then selects to close out the electronic mail message by sending it. The message/task application 116 then stores a copy of the electronic mail message within the message store of the message/task application 116 at message operation 910. The stored electronic mail message may surface within a default folder or within a folder that is specified by the sender when composing the electronic mail message. For example, a copy may be stored in the message store and be set to surface by default within a Sent Items folder. Furthermore, the electronic mail message may surface within additional folders used for processing purposes based on the header data included within the message. For example, the message may surface within a swap folder and/or a reminder folder, both of which are discussed in more detail below, where such folders allow messages to be discovered in order to perform a particular post-send process for providing a notification to the sender.

Figure 5:
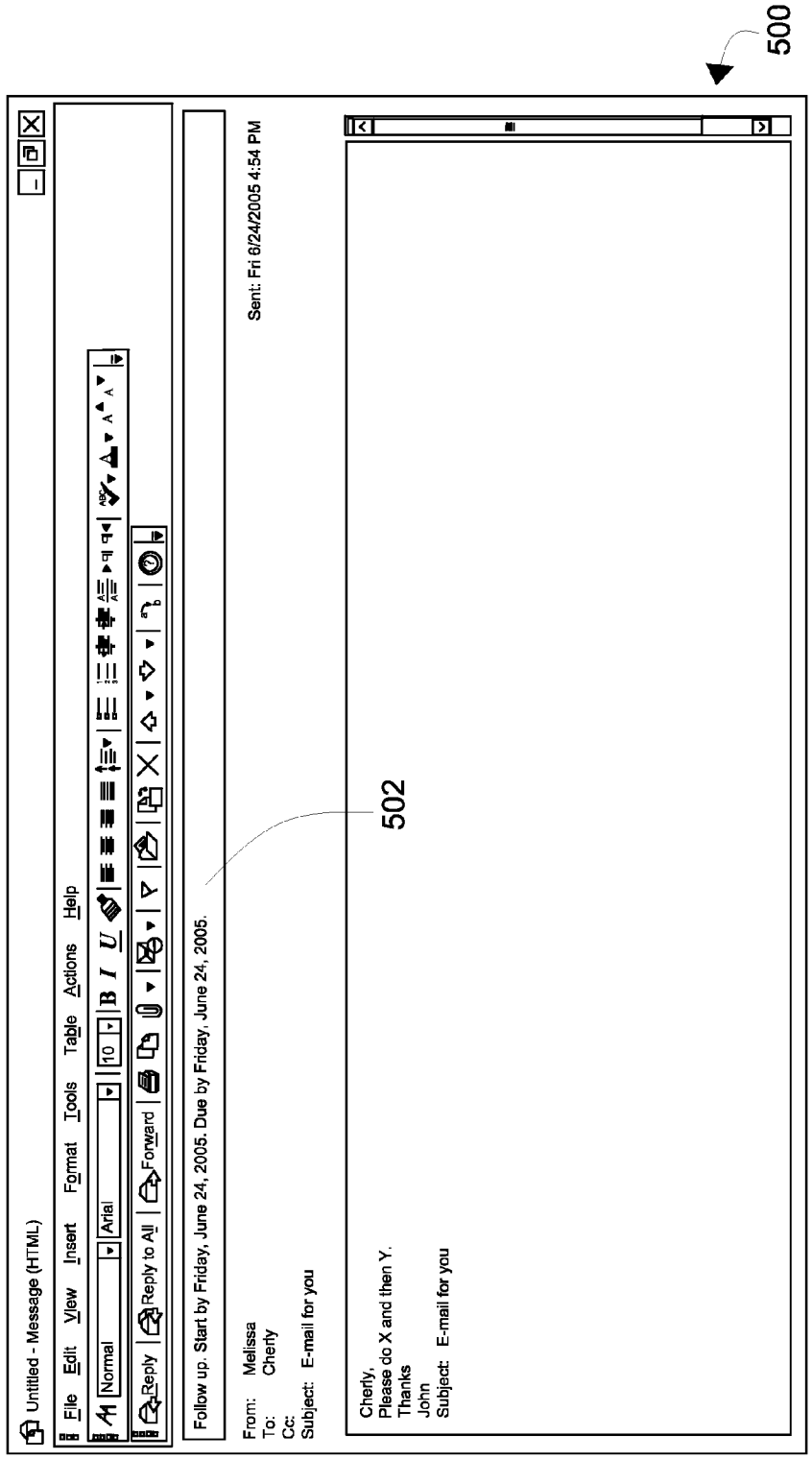
FIG. 5 is a screenshot showing an example of a window showing a stored copy of the electronic mail message of FIG. 2 once the electronic mail message has been sent.
Figure 6:
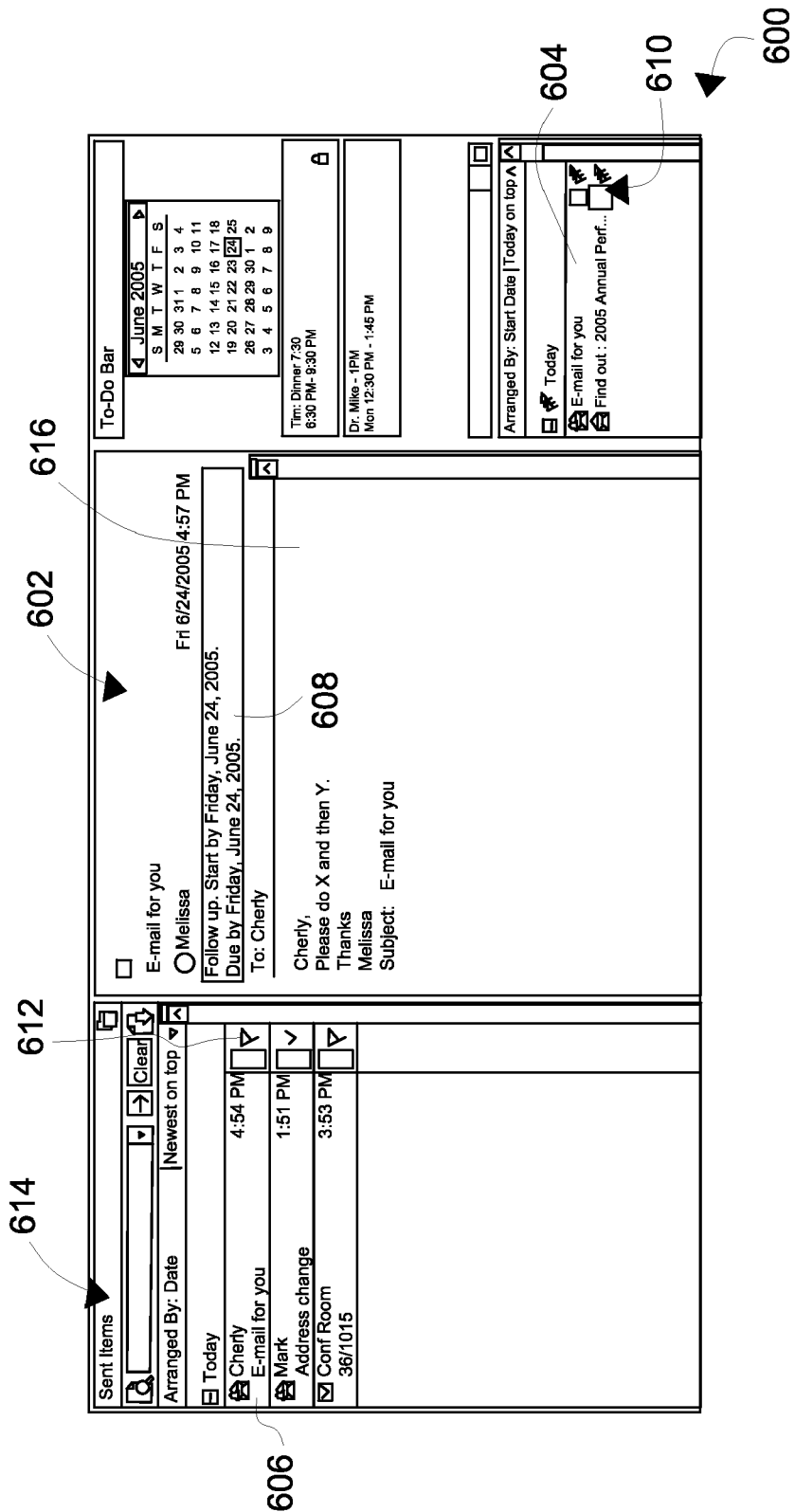
FIG. 6 is a screenshot showing an example of an electronic mail management program that also manages tasks where the stored copy of the sent electronic mail message is shown in a preview pane while a notification is being provided to the sender by having an item corresponding to the electronic mail message appear in a to-do bar.

Now referring to FIG. 5, screenshot window 500 includes the stored copy of the electronic mail message after it has been sent by the user and thus shows how it would appear when opened from a folder after being sent, such as the Sent Items folder as shown. The information bar 502 provides a notification that indicates the details entered by the sender for the flag set for the sender for the electronic mail message and may also indicate the details entered by the sender for the flag set for the recipient. In this embodiment, the portion of this notification that pertains to the flag set by the sender for the sender is not transferred for the copy of the electronic mail message that is sent to the recipient such that the recipient does not see that the sender has set a flag for the sender.

The notification located in the information bar 502 results from the message/task application 116 performing post-send processing on the copy of the electronic mail message and the flag data that it contains at post process operation 912 of FIG. 9B. Such post-processing in the context of mail messages that have been sent by the user and the relationship of post-processing to the flag data is discussed in greater detail below in relation to FIG. 10 and the progression of the states of the electronic mail message.

The post-processing of operation 912 may provide for various other forms of notification to be provided to the sender. For example, with reference to FIG. 6 and screenshot window 600, a to-do bar 610 within the graphical user interface includes task items and a task item 604 that corresponds to the electronic mail message is included to provide a form of notification about the electronic mail message to the sender at task operation 914. The task item 604 is organized within the to-do bar based on the flagging details entered by the sender, and in this example, the to-do bar is arranged by start date and the start date entered by the sender is "today." The task item 604 serves as a control to open the stored copy 606 of the electronic mail message when the sender clicks or otherwise selects to open the task item 604.

As shown, the sender has the Sent Items folder 614 open and has highlighted the stored copy 606 of the electronic mail message such that the message body 616 is being displayed within a preview pane 602. The stored copy 606 that surfaces in the Sent Items folder 614 has a flag 612 to further indicate to the sender that this particular electronic message has been flagged. The preview pane 602 also includes the information bar 608 that is separate from the message body 616 and that further provides notice to the sender about the details of the flagging, including specifying the start date and due date for the sender that has been specified in the flagging details by the sender and may also display any flagging details set by the sender for the recipient. It will be appreciated that the information bar 608 providing the same notification as shown may also be present where the stored copy 606 is opened in a separate window rather then being displayed in the preview pane 602.

The flagged electronic mail message that has been sent is added to the to-do bar 610 by finding a to-do property in the flag data that has been generated. As discussed below with reference to FIG. 10, in the context of a MAPI-compliant messaging engine, manipulation of the location of the to-do property occurs so that the to-do item may be generated for the sender but not for the recipient, such as for embodiments where there is no separate flagging for recipients or where there is separate flagging for recipients but the sender chose not to flag for the recipient.

Figure 7:
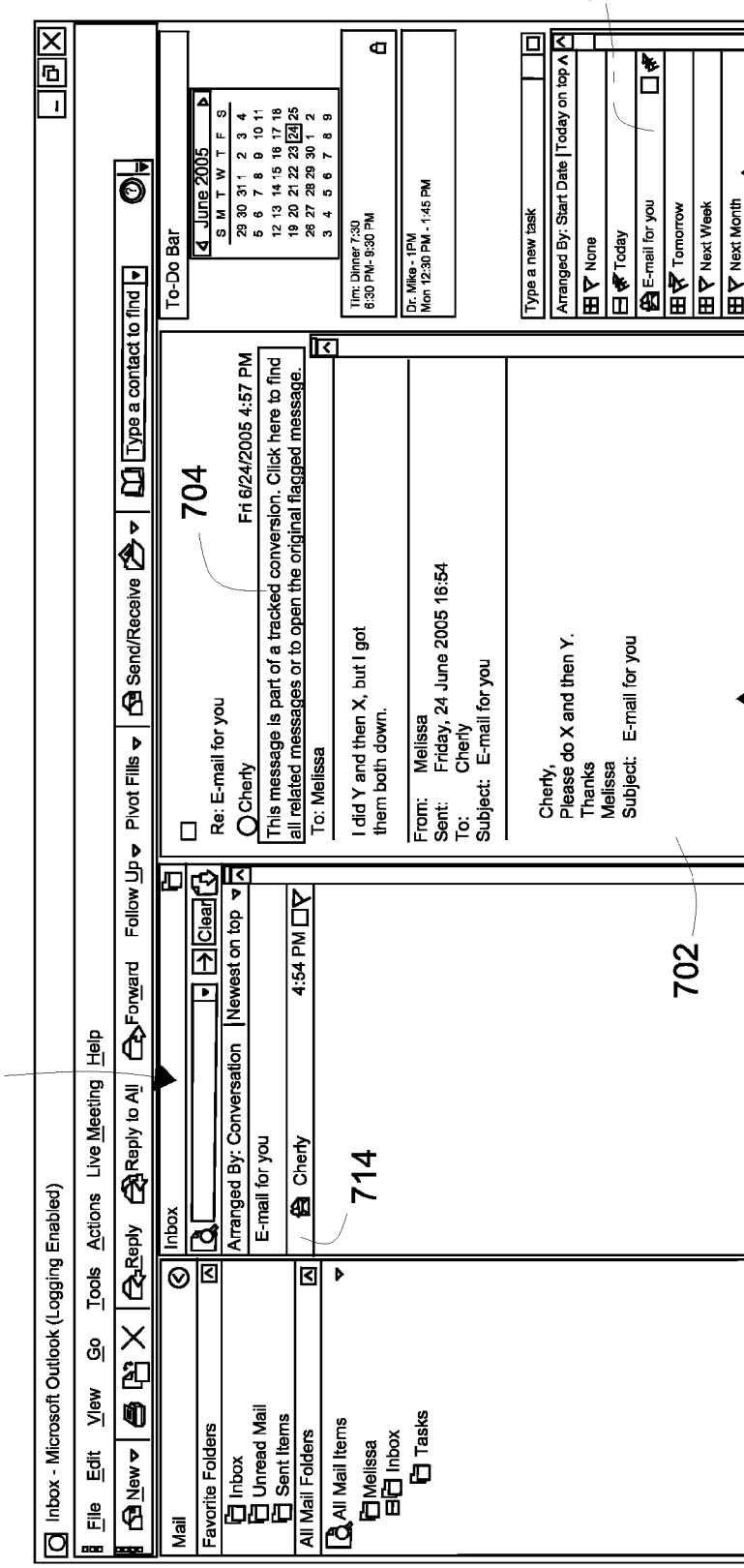
FIG. 7 is a screenshot showing the example of the electronic mail management program that also manages tasks where an incoming electronic mail message that is related to the sent electronic mail message is being displayed in a preview pane while a notification is being provided to the sender by including an indication in the window of the incoming electronic mail message that it is related to the sent electronic mail message.

Another example of notification to the sender provided by the post-send processing of post-send operation 912 is shown with reference to FIG. 7. Here, a screenshot window 700 shows that the sender has the Inbox folder 712 open and an incoming electronic mail message 714 that has been sent in reply to the flagged electronic mail message sent by the sender is highlighted. A preview pane 710 displays the incoming electronic mail message including the message body 702 and an information bar 704 separate from the message body 702.

To further provide notification to the sender regarding the flagged electronic mail message that has been sent, the message/task application 116 causes the information bar 704 of the incoming electronic mail message 714 to include an indication that the incoming electronic mail message 714 is part of a tracked branch of conversation relative to a sent electronic mail message at thread operation 918. The information bar 704 further indicates to the sender that the sender may click the information bar 704 in order to open the flagged electronic mail message that has been sent and that is related to this particular incoming electronic mail message 714. It will be appreciated that the information bar 704 providing the same notification may also be present where the incoming electronic mail message 714 is opened in a separate window rather then being displayed in the preview pane 710.

The message/task application 116 provides the notification in the information bar 704 based at least on thread identifiers and may also base the notification on whether an incoming message is a descendant message that is part of a tracked branch relative to a message previously flagged and sent by the sender. The message/task application 116 determines at least whether the incoming electronic mail messages have a thread identifier in the header data that matches the thread identifier of the flagged electronic mail message that has been sent at thread operation 918. In one embodiment when the thread identifier of the two electronic mail messages match, then the information bar 704 is provided with the appropriate notification, and the information bar 704 links to the flagged electronic mail message that has been sent and that has the matching thread identifier. In another embodiment where it is desirable to indicate that the message is specifically part of a flagged branch of the ongoing conversation, the message/task application 116 may also determine whether the incoming electronic mail messages also are descendants of the sent electronic mail message flagged by the sender based on the send time of each and then only provide the notification of the incoming message being a part of the tracked conversation when the thread ID matches and when the incoming message is a descendant. In this embodiment, an option to find all related messages may be included where this option functions to find all the electronic mail messages in the store that have the matching thread ID without regard to whether the messages are descendants.

While the message body 702 of this example includes the header and message body of the electronic mail message that has been sent, the recipient could have chosen to not include this in the incoming electronic mail message. In that case, the information bar 704 would have been the only way that the sender could have noticed that the incoming electronic mail message was related to the flagged electronic mail message that was sent. Additionally, even when the recipient chooses to include the header and message body within the reply sent back to the sender in this example, the sender cannot open the flagged electronic mail message by clicking somewhere within the message body. Thus, clicking on the information bar 704 is the most convenient way to open the flagged electronic mail message that was sent in this example.

Screenshot window 700 further illustrates that while the Inbox folder 712 is open, the to-do bar 708 may remain present within the window 700. Furthermore, the to-do bar 708 continues to display the task item 706 that corresponds to the flagged electronic mail message that has been sent.

Figure 8:
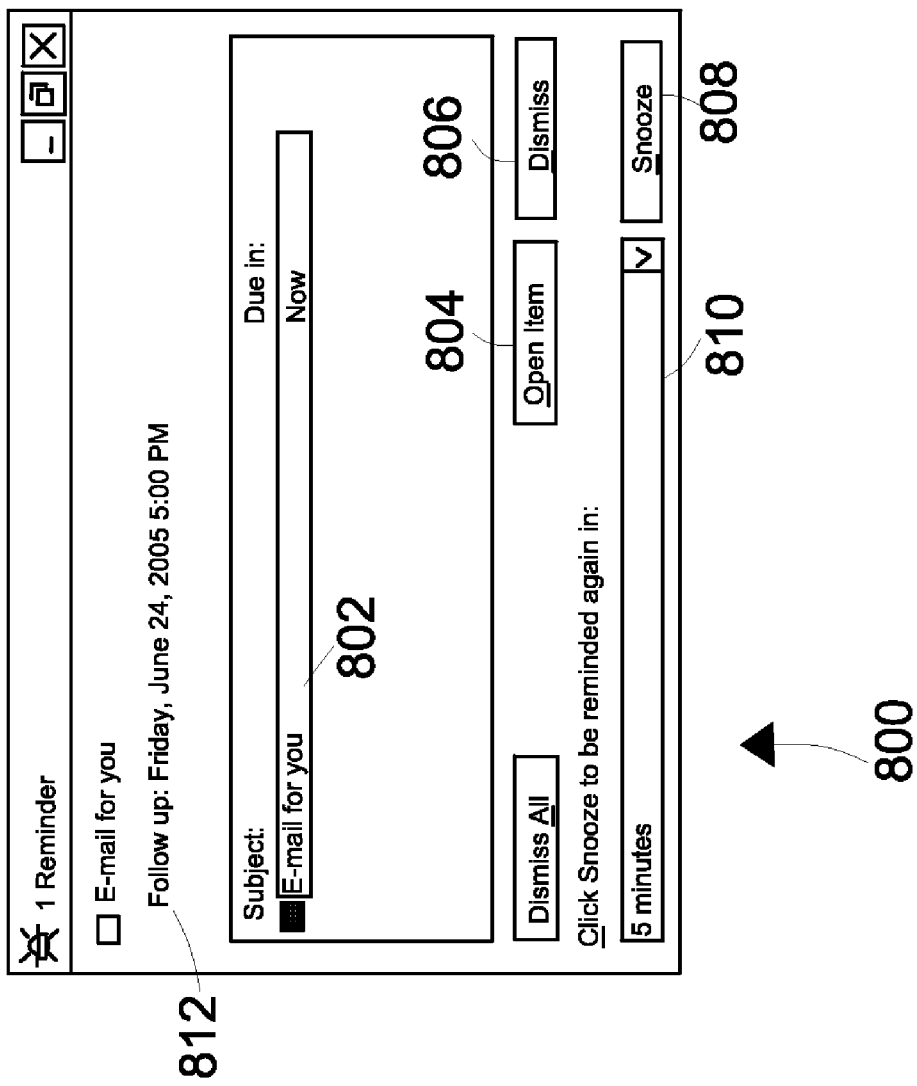
FIG. 8 is a screenshot showing an example of a dialog box where the dialog box serves as a reminder related to the electronic mail message composed by the sender to provide a notification to the sender.
Figure 9A:
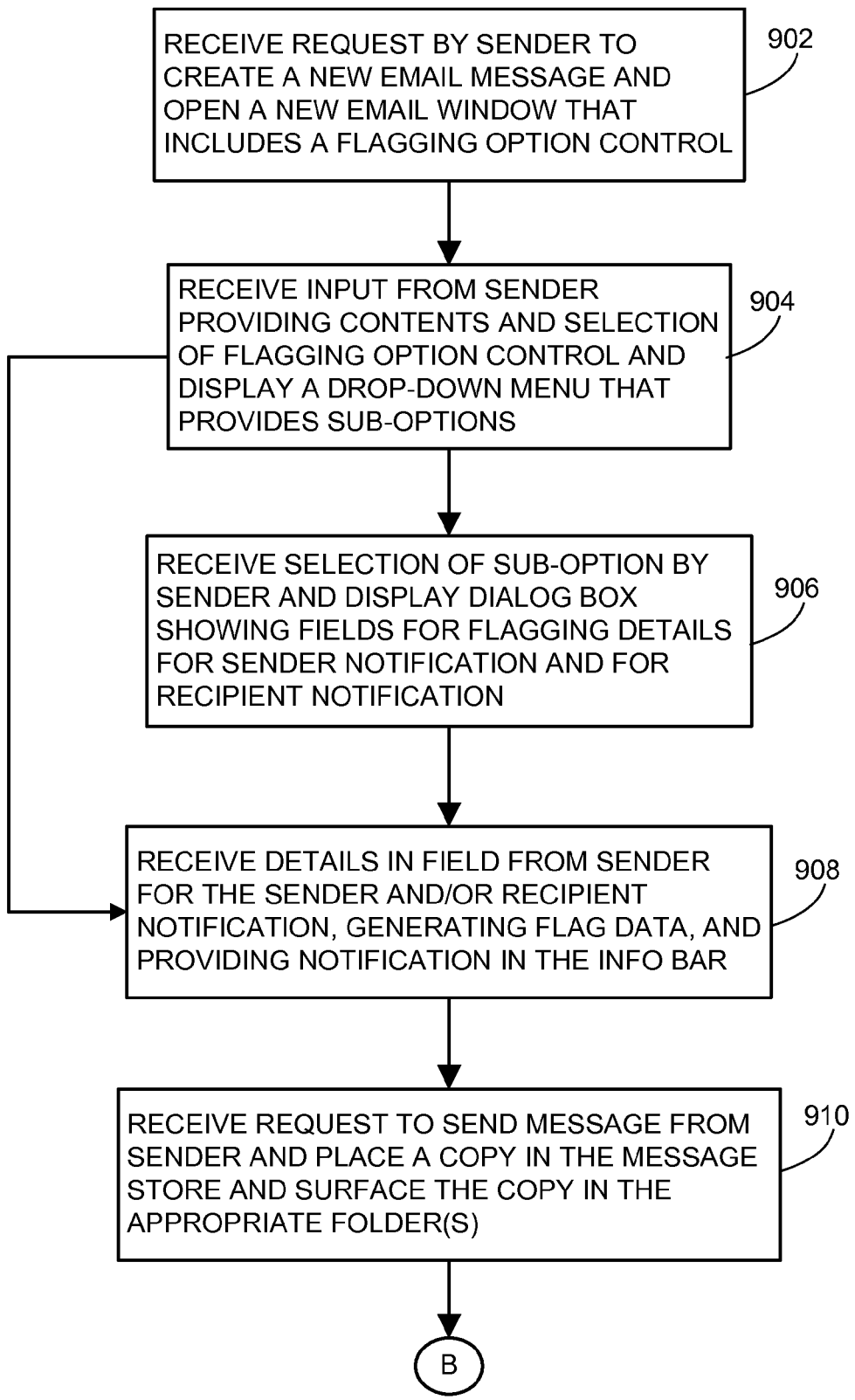
FIGS. 9A and 9B show an example of an operational flow that may be performed to provide for the flagging of the electronic mail message for the user of the message/task application and the resulting notification to the user.
Figure 9B:
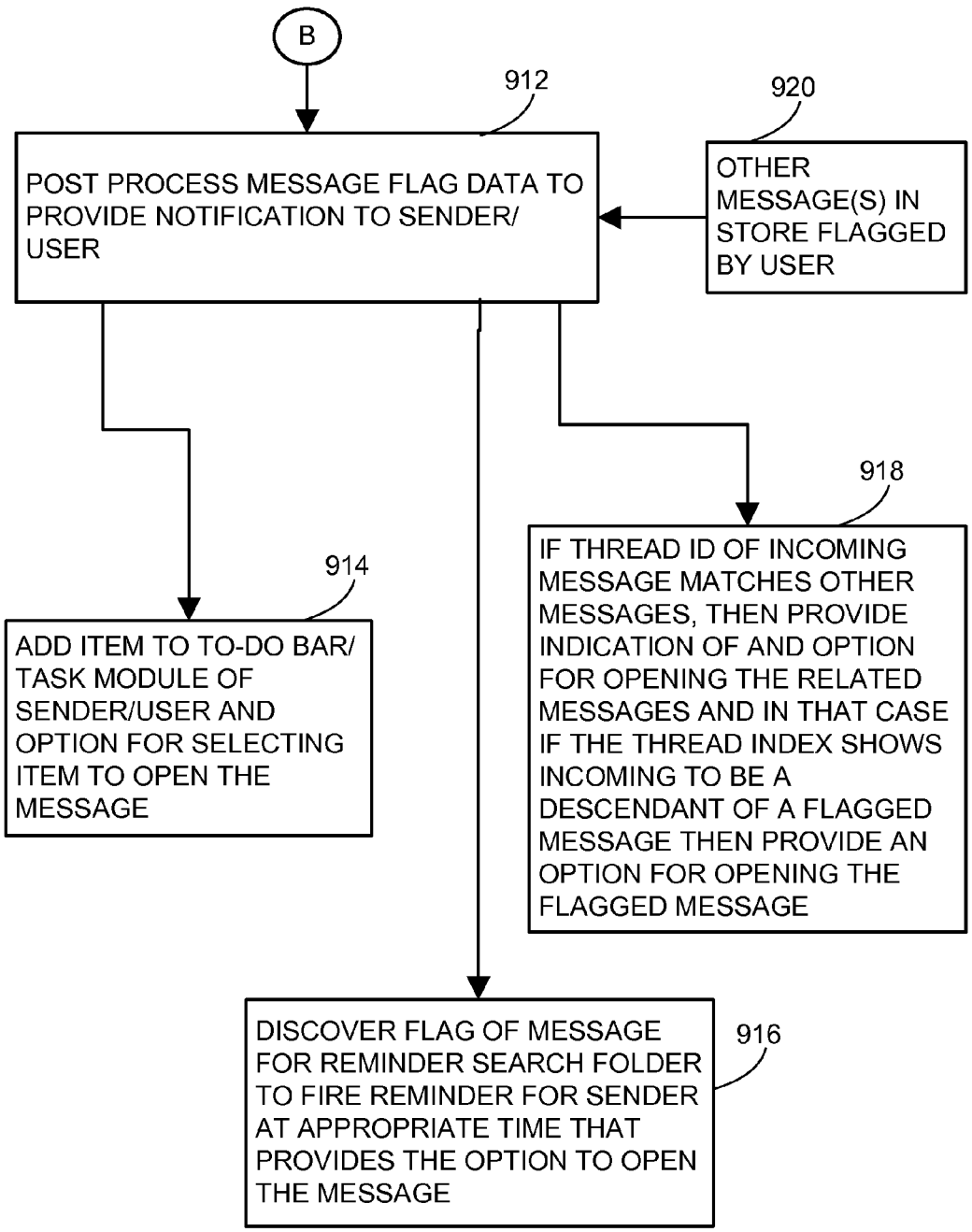

Yet another example of notification to the sender provided by the post-send processing of post-process operation 912 is shown with reference to FIG. 8. Here, a reminder dialog box 800 is fired so as to be displayed for the sender at reminder operation 916 at a time designated by the sender in the flagging details. The reminder 800 of this example includes an item 802 that corresponds to the flagged electronic mail message that has been sent. A control 804 is provided to open the flagged electronic mail message, or the sender may double click on the item 802 in order to open the flagged electronic mail message. Additional information of the flagging details 812 such as the end date specified for the flag may also be included within the reminder 800. Other standard reminder controls may also be provided, such as a snooze button 808 and a snooze time drop down menu 810.

The reminder 800 may be fired in the normal manner by discovering the flagged electronic mail message within a reminder search folder where it has surfaced at operation 910 based on the flag data including a reminder property, and where a persistent search of the reminder folder is done to find a flagged electronic message whose reminder property in the flag data specifies a reminder fire time equal to the current time. Once the reminder fire time for the flagged electronic mail message is reached, the reminder 800 is fired for display to the sender. As discussed below with reference to FIG. 10, in the context of a MAPI-compliant messaging engine, manipulation of the location of the reminder property occurs so that the reminder may be generated for the sender but not for the recipient, such as for embodiments where there is no separate flagging for recipients or where there is separate flagging for recipients but the sender chose not to flag for the recipient.

As an alternative manner of providing the notifications to the user of the message/task application 116, the user may set a flag for a message in the message store at some time other than when the message is being composed and even for messages that are received by the user rather than those that have been sent. For example, the user can flag a message after the message has been sent and then surfaces in a Sent Items folder or flag a message after the message has been received and then surfaces in an Inbox folder. As shown in FIG. 9B, the message/task application 116 may receive flagging details from the user for the surfaced message within the message store at flag operation 920. The message/task application then processes the message flag data of the copy of the message at post-process operation 912 due to its presence within a search folder. In this context where the message is being flagged other than on compose, the post-process operation 912 is not performing post-send process as discussed above, but is providing the same processing in a post-flagging context. Operational flow proceeds from the post-processing such that the notification for the flagged message in the message store may then be provided to the sender via operations 914, 916, and 918 in the same manner as discussed above.

It should be noted that in the embodiments discussed above, the notifications may cease to be provided if one of various conditions are met. If the user chooses to not keep a saved copy of the electronic mail message that has been flagged and chooses not to be included on the recipient list for sent electronic mail messages, then there is no stored copy to surface within a search folder corresponding to reminders, to-do bars, tracked conversations, etc. such that no notification regarding the sent electronic mail message is provided. Furthermore, in these embodiments, the user may choose to clear the flag or mark the saved copy as completed by accessing the saved copy from one of the folders where it has surfaced or by accessing the item that has surfaced within the to-do bar. Once the flag has been cleared or the sender has marked the item has being completed, the flag data is no longer found via the search folders such that the notifications are no longer provided.

Figure 10:
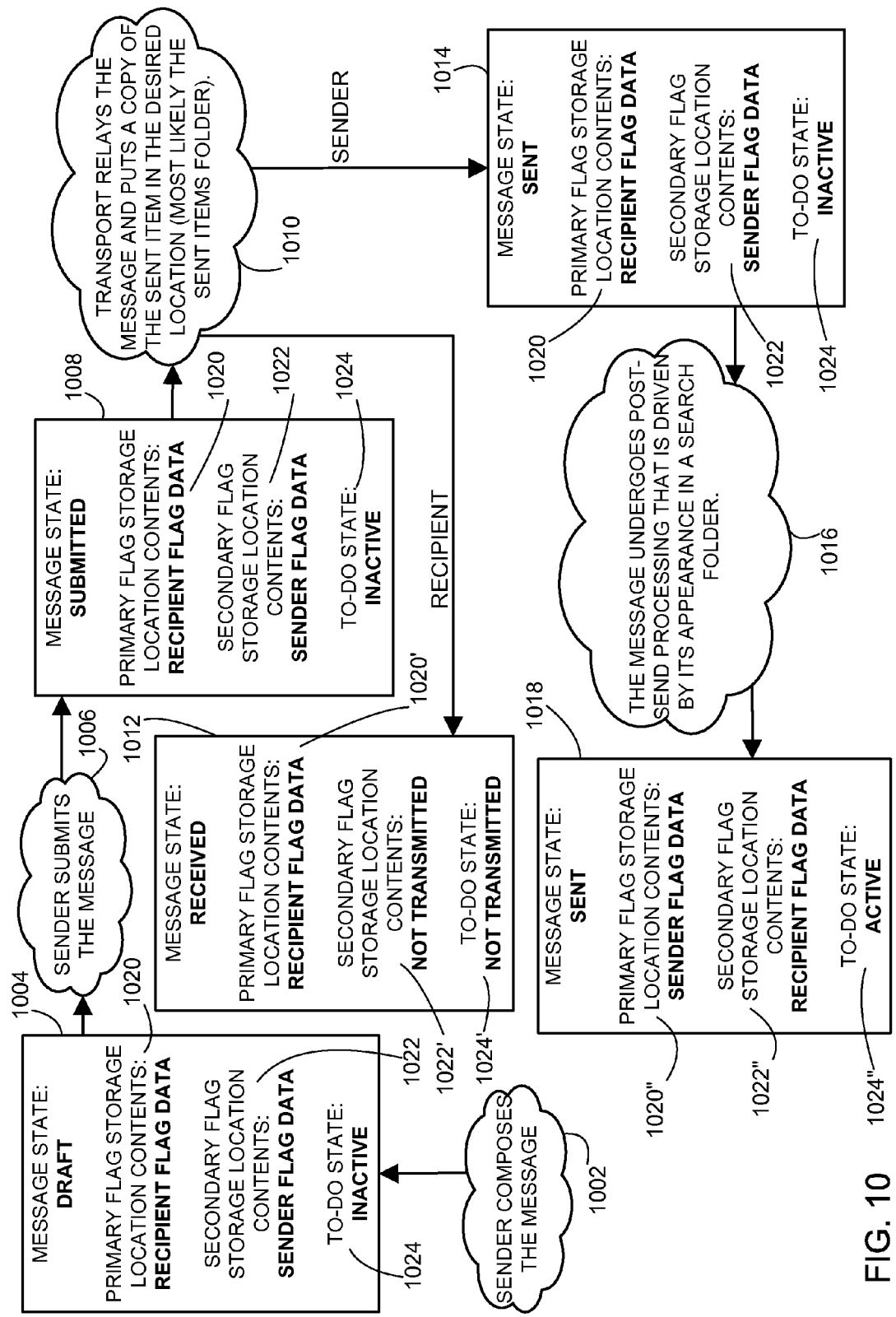
FIG. 10 is a diagram representing an example of the progression of states of the electronic mail message resulting from the sender selecting the option to flag and then sending the electronic mail message.

FIG. 10 shows the progression of the state of the electronic message that is being sent by the sender from the time it is being composed until the time it has been sent to the recipient and stored to surface in a folder for the sender. FIG. 10 and the related discussion are based on a message/task application that is MAPI-compliant. However, it will be appreciated that one or more of the concepts discussed in relation to FIG. 10 may also be applicable to other types of messaging systems.

The progression begins by the sender composing the new electronic mail message at compose operation 1002, which includes the sender flagging the message and providing the flagging details such as the dates and whether a reminder should fire. At that time, the electronic mail message 1004 has a draft state where the flag data that pertains to flagging for the recipient, i.e., recipient flag data, is stored in a primary storage location 1020 of the draft electronic message 1004. Also in this draft state, the flag data that pertains to flagging for the sender, i.e., sender flag data, is stored in a secondary storage location 1022. At this point, as the electronic mail message has an inactive To-Do state 1024 since it is in draft format and has not been post-send processed.

Once the sender has completed composing the electronic mail message, the sender submits the electronic mail message at send operation 1006. At this point, the electronic mail message 1008 within the message/task application 116 of the sender takes on a submitted state. In the submitted state, the recipient flag data remains in the primary storage location 1020 while the sender flag data remains in the secondary storage location 1022. Also, there has been no post-send processing such that the To-Do state 1024 remains inactive.

After the electronic mail message 1008 is placed into the submitted state, the transport mechanism of the message/task application 116 does two things at send operation 1010. The transport mechanism relays the electronic mail message to the address of the recipient. The transport mechanism also stores a copy of the electronic mail message in the message store so that it may surface within a designated folder for the sender, such as the Sent Items folder.

In the context of the MAPI-compliant message/task application 116, the secondary location 1022 of the submitted message 1008 is out of range for purposes of relaying the electronic mail message to recipients. Accordingly, the sender flag data is not relayed as part of the electronic mail message 1012 such that the secondary location of electronic mail message 1022' is empty. Furthermore, the To-Do state of the application is also not transmitted with the message since the message/task application of the recipient may post-receive process the primary location 1020' to handle whatever the recipient flag data specifies. Since the sender flag data is not transferred, there is no risk that the flags that are set for the sender, not for the recipient, and that are set by the sender will cause the message to also be treated as flagged for the recipient by the message/task application of the recipient.

However, for some embodiments, steps may be taken to ensure that even if the sender flag data is transferred, or where the sender and recipient share the same mail server and a single instance of the message exists in order to surface in both mailboxes, the sender flag data does not become exposed to the recipient such as by an information bar message or otherwise. These steps may include providing a second value for the electronic mail message 1008 that has been submitted where the second value that is also non-transmittable by a MAPI transport under normal circumstances and that uniquely identifies the sender. This second value may then be checked against the current user to determine whether this electronic mail message is sent by the current user or not. Where the secondary location 1022 and the second value identifying the sender are mistakenly transmitted to the recipient, then the message/task application of the recipient will detect the message within a swap search folder and will then compare the current user to the second value that identifies the sender. If the two do not match, then the secondary flag location 1022' and the second value are simply deleted from the electronic mail message 1012 by the message/task application of the recipient. Where the message/task application of the recipient does not support flagging such that the comparison of the second value to the current user is not performed and the secondary flag data remains, then the secondary flag data is meaningless and goes unused.

Where the sender has not flagged the electronic mail message for the recipient, then the recipient flag data of primary location 1020' will be empty since there has been no recipient flag data generated and since the sender flag data that was generated was not included in the primary location 1020 and therefore was not transferred. Accordingly, no notifications will be provided automatically for the recipient based on the electronic mail message 1012 that has a received status within the message/task application of the recipient. Instead, the recipient will be required to set any notifications such as by manually flagging the message for follow-up, setting a reminder, and adding a separate task if desired. However, where the sender has flagged the electronic message for the recipient, then post-receive processing of the electronic mail message 1012 will result in notifications being automatically set for the recipient based on the flagging details for the recipient that have been set by the sender if the recipient is using a message/task application that utilizes such flag data. Additionally, the message/task application of the recipient may allow the recipient to overwrite the flag data for the received electronic mail message 1012.

A stored copy of the electronic mail message 1014 that is retained within the message store by the message/task application 116 of the sender now has a status of sent. However, just prior to any post-send processing of the stored copy 1014, the primary location 1020 retains the recipient flag data while the secondary location 1020 retains the sender flag data. Additionally, the To-Do state 1024 maintains an inactive status. As discussed above, the electronic mail message 1014 may include the second value that is non-transmittable and that identifies the sender.

Shortly after the stored copy 1014 has been created, post-send processing of the stored copy 1014 occurs at post-send operation 1016. The stored copy 1014 undergoes post-send processing due to the stored copy 1014 surfacing in a search folder that triggers such processing. For example, the stored copy 1014 may surface within a swap search folder that has criteria for finding messages that require the flag data to swap locations. This post-send processing to find the sent message and perform a swapping operation is set to occur prior to other post-send processing search folders such as the reminder search folder to prevent the recipient flag data from causing notifications intended for the recipient to be mistakenly provided to the sender.

In this particular example where the second value that identifies the sender is present, the search criteria of the swap search folder where the stored copy 1014 of the sent electronic message will surface includes looking for electronic messages in the message store that have a status of sent but also include the second value that identifies the sender. The second value is compared to the current user, in this case the sender, and because they match, this indicates that the primary location 1020 and the secondary location 1022 have not been swapped. In that case, the contents of the primary location 1020 and the contents of the secondary location 1022 are swapped so that the sender flag data is now in the primary location and is actionable by search folders for generating notifications to the sender while the recipient flag data is present in the secondary location to preserve the flagging details set by the sender for the recipient. Furthermore, the second value that identifies the sender is deleted such that the electronic mail message no longer satisfies the criteria of the swap search folder so that no additional swapping occurs.

Accordingly, when post-send processing the message that has the sender flag data in the secondary location 1022 of the stored copy 1014 and/or recipient flag data in the primary location 1020, then the sender flag data and the primary flag data swap locations as shown in post-send processed copy 1018. This stored copy 1018 has a sent state, has the sender flag data stored in the primary location 1020", and has the recipient flag data stored in the secondary location 1022".

After swapping the location of the recipient flag data and the sender flag data, the primary location 1020" may be acted upon to provide notifications in accordance with the sender flag data. For example, the sender flag data being present may result in changing the To-Do state 1024" to active to thereby surface an item corresponding to the electronic mail message 1018 into the to-do bar. Furthermore, the sender flag data being present may result in a reminder search finding the reminder property of the sent flag data that specifies when to fire a reminder. Additionally, the sender flag data being present may result in the thread ID of the stored copy 1018 being referenced when incoming electronic messages are received so that when a matching thread ID and thread index are found, the information bar of the incoming electronic message indicates that there is an electronic message 1018 within the tracked conversation.

The embodiments discussed above may include various properties that the MAPI-compliant message/task application operates upon. Those properties that are specifically associated with providing the notifications based on the electronic message being flagged for the sender include:

PR_SWAPPED_TODO_DATA—this is the secondary flag location, which holds the sender's flag information during compose, should be empty on the recipients' copies of the message, and contains the flag information that was sent to the recipients on the sender's copy of the sent item, and PR_SWAPPED_TODO_STORE—the unique identifier used to identify the sender and whose existence implies that the item has not yet been swapped.

While the invention has been particularly shown and described with reference to various embodiments thereof, it will be understood by those skilled in the art that various other changes in the form and details may be made therein without departing from the spirit and scope of the invention. For example, although the post-processing to provide the notification is said to occur by acting upon flag data in the primary location, which provides for backward compatibility with pre-existing MAPI messaging applications, embodiments not requiring such backward compatibility may alternatively provide for separate logic that looks for sender flags in the secondary location of sent items while other separate logic looks for non-sender flags in the primary location of received items such that swapping of the flag data is not performed in order to provide sender notifications to senders and recipient notifications to recipients.

What is claimed is:

1. A method of tracking an electronic mail message, comprising:
    providing a window of a graphical user interface that allows a sender to compose an electronic mail message;
    while the sender is composing the electronic mail message, providing an option to flag the electronic mail message to provide a notification that is only for the sender;
    receiving selection of the option to flag by the sender, including sender flag data in a flag storage location of the electronic mail message, wherein the electronic mail message comprises a primary flag storage location that transfers with the message when the message is sent, a secondary flag storage location that does not transfer with the message when the message is sent, and a to-do state that is initially set to inactive, wherein including the sender flag data comprises storing the sender flag data in the secondary flag storage location of the electronic mail message;
    sending the electronic mail message;
    after the electronic mail message has been sent, moving the sender flag data from the secondary flag location of a stored copy of the electronic mail message to the primary flag location of the stored copy of the electronic mail message; and
    after the electronic mail message has been sent, changing the to-do state to active thereby surfacing an item corresponding to the electronic mail message into a to-do bar of the graphical user interface.

2. The method of claim 1, further comprising, after the electronic mail message has been stored, further referencing the sender flag data to provide a notification to the sender regarding the electronic mail message.

3. The method of claim 2, wherein referencing the sender flag data to provide the notification to the sender comprises providing a reminder associated with the electronic mail message.

4. The method of claim 3, further comprising surfacing a copy of the electronic mail message in a folder of the sender.

5. The method of claim 1, further comprising opening the electronic mail message upon receiving a selection of the item of the to-do bar.

6. The method of claim 1, wherein upon selection of the option to flag, providing a dialog box that requests a reminder date that forms a part of the sender flag data and wherein referencing the sender flag data to provide the notification to the sender comprises generating on the reminder date a reminder dialog box that refers to the electronic mail message.

7. The method of claim 6, wherein the reminder includes an item associated with the electronic mail message, the method further comprising:
    storing a copy of the electronic mail message in a message store; and
    opening the stored copy of the electronic mail message from the message store upon receiving a selection of the item of the reminder.

8. The method of claim 1, wherein the sender flag data includes a thread identifier, the method further comprising:
    sending the electronic mail message; and
    receiving by the sender an incoming electronic mail message that is related to the electronic mail message that has been sent and that has a thread identifier that matches the thread identifier of the sender flag data and has a thread index indicating that the incoming electronic mail message is a descendant of the sent electronic mail message; and
    providing an indication within an information bar of the incoming electronic mail message that the incoming electronic mail message is within a tracked branch of electronic mail messages relative to the electronic mail message that has been sent.

9. The method of claim 8, further comprising:
    upon sending the electronic mail message, storing a copy of the electronic mail message in a message store wherein messages related to the copy of the electronic mail message are also stored in the message store;
    providing to the sender within the window of the incoming electronic mail message an option to retrieve the stored copy of the electronic mail message that has been sent and an option to retrieve all related messages in the message store; and
    opening the stored copy of the electronic mail message from the message store upon the sender selecting the option to retrieve the stored copy and displaying a list of the related messages upon the sender selecting the option to retrieve related messages.

10. The method of claim 1, wherein upon selection of the option to flag, providing a list of sub-options where at least one of the sub-options has default flag data values and upon selection of one of the sub-options, providing a dialog box that requests a flag state that forms a part of the sender flag data.

11. The method of claim 1, wherein upon selection of the option to flag, providing a list of sub-options including selections for providing a follow-up date for the sender that are to be posted with the to-do bar.

12. A computer storage memory having computer-executable instructions encoded thereon that perform acts comprising:
- providing a window of a graphical user interface that allows a sender to compose an electronic mail message;
- while the sender is composing the electronic mail message, providing an option to flag the electronic mail message to provide a notification that is only for the sender;
- receiving selection of the option to flag by the sender, including sender flag data in a flag storage location of the electronic mail message, wherein the electronic mail message comprises a primary flag storage location that transfers with the message when the message is sent, a secondary flag storage location that does not transfer with the message when the message is sent, and a to-do state that is initially set to inactive, wherein including the sender flag data comprises storing the sender flag data in the secondary flag storage location of the electronic mail message;
- sending the electronic mail message;
- after the electronic mail message has been sent, moving the sender flag data from the secondary flag location of a stored copy of the electronic mail message to the primary flag location of the stored copy of the electronic mail message; and
- after the electronic mail message has been sent, changing the to-do state to active thereby surfacing an item corresponding to the electronic mail message into a to-do bar of the graphical user interface.

13. The computer storage memory of claim 12, further comprising, after the electronic mail message has been stored, further referencing the sender flag data to provide a notification to the sender regarding the electronic mail message.

14. The computer storage memory of claim 13, wherein referencing the sender flag data to provide the notification to the sender comprises providing a reminder associated with the electronic mail message.

15. The computer storage memory of claim 14, further comprising surfacing a copy of the electronic mail message in a folder of the sender.

16. The computer storage memory of claim 12, further comprising opening the electronic mail message upon receiving a selection of the item of the to-do bar.

17. The computer storage memory of claim 12, wherein upon selection of the option to flag, providing a dialog box that requests a reminder date that forms a part of the sender flag data and wherein referencing the sender flag data to provide the notification to the sender comprises generating on the reminder date a reminder dialog box that refers to the electronic mail message.

18. A computer system, comprising:
- a display; and
- a processor executing instructions causing the processor to perform acts comprising:
- providing an option for a user to select for an electronic mail message to be flagged;
- receiving selection of the option to flag by the sender, including sender flag data in a flag storage location of the electronic mail message, wherein the electronic mail message comprises a primary flag storage location that transfers with the message when the message is sent, a secondary flag storage location that does not transfer with the message when the message is sent, and a to-do state that is initially set to inactive, wherein including the sender flag data comprises storing the sender flag data in the secondary flag storage location of the electronic mail message;
- sending the electronic mail message;
- after the electronic mail message has been sent, moving the sender flag data from the secondary flag location of a stored copy of the electronic mail message to the primary flag location of the stored copy of the electronic mail message; and
- after the electronic mail message has been sent, changing the to-do state to active thereby surfacing an item corresponding to the electronic mail message into a to-do bar of the graphical user interface.

19. The computer system of claim 18, further comprising opening the electronic mail message upon receiving a selection of the item of the to-do bar.

20. The computer system of claim 18, wherein upon selection of the option to flag, providing a list of sub-options where at least one of the sub-options has default flag data values and upon selection of one of the sub-options, providing a dialog box that requests a flag state that forms a part of the sender flag data.

* * * * *